US008361374B2

(12) United States Patent
Weyand et al.

(10) Patent No.: US 8,361,374 B2
(45) Date of Patent: Jan. 29, 2013

(54) METHOD OF MAKING BUILDING BLOCKS FROM CLAY-CONTAINING COMPOUNDS

(75) Inventors: Thomas E. Weyand, New Brighton, PA (US); Dale L. Nickels, Beaver Falls, PA (US)

(73) Assignee: Pittsburgh Mineral and Environment Technology, Inc., New Brighton, PA (US)

( * ) Notice: Subject to any disclaimer, the term of this patent is extended or adjusted under 35 U.S.C. 154(b) by 506 days.

(21) Appl. No.: 12/249,544

(22) Filed: Oct. 10, 2008

(65) Prior Publication Data

US 2010/0090378 A1    Apr. 15, 2010

(51) Int. Cl.
*B28B 3/00*    (2006.01)
(52) U.S. Cl. ........................ 264/333; 264/680
(58) Field of Classification Search .................. 264/680, 264/333
See application file for complete search history.

(56) References Cited

U.S. PATENT DOCUMENTS

| | | | | |
|---|---|---|---|---|
| 1,859,227 | A | * | 5/1932 | Willetts ........................ 264/658 |
| 3,468,993 | A | * | 9/1969 | Bierlich ........................... 264/43 |
| 3,590,111 | A | * | 6/1971 | Gebefugi ...................... 264/234 |
| 5,534,058 | A | | 7/1996 | Strabala |
| 5,676,905 | A | * | 10/1997 | Andersen et al. ............. 264/426 |
| 5,968,254 | A | | 10/1999 | Dodgen et al. |
| 6,068,803 | A | | 5/2000 | Weyand et al. |
| 2002/0060015 | A1 | | 5/2002 | Stivers |
| 2003/0205182 | A1 | | 11/2003 | Stivers |
| 2004/0040245 | A1 | | 3/2004 | Sinclair, Sr. et al. |

OTHER PUBLICATIONS

Maeda et al. "Hydrothermal synthesis of mesoporous materials derived from metakaolinite." Proceedings of International Symposium on EcoTopia Science 2007, 2007. pp. 742-744.*
ASTM Test Method C67-00, Standard Test Methods for Sampling and Testing Brick and Structural Clay Tile, pp. 28-38, Sep. 2000.
ASTM C73-99a, Standard Specification for Calcium Silicate Brick (Sand-Lime Brick), pp. 39-40, Jan. 2000.

* cited by examiner

*Primary Examiner* — Matthew Daniels
*Assistant Examiner* — Erin Snelting
(74) *Attorney, Agent, or Firm* — Eckert Seamans Cherin & Mellott, LLC; Carol A. Marmo

(57) ABSTRACT

A method of making a building block from clay-containing compounds, which includes employing a major amount of such clay-containing material in combination with a calciferous additive and water to cure the shape the same under the influence of controlled pressure and temperature for a predetermined time to create building block which is characterized by a mineralogical crystalline phase. The clay-containing compound includes a mixture of fine particulate material and coarser particulate material. The product produced by the method is also disclosed.

18 Claims, No Drawings

METHOD OF MAKING BUILDING BLOCKS FROM CLAY-CONTAINING COMPOUNDS

FIELD OF THE INVENTION

This invention relates to an improved method for the manufacture of shaped building blocks from clay-containing products. More specifically, the invention relates to a method for producing high strength building blocks of precise dimensions and desired properties from clay-containing compounds such as non-ferrous mine tailings and quarry fines.

DESCRIPTION OF RELATED ART

Due to the rapidly diminishing availability of suitable landfill space and the escalating cost of land disposal, the daily generation of large volumes of mining wastes can create a costly disposal problem for mines throughout the world. Accordingly, companies operating such mines have a desire to find high volume, income producing, commercial uses for mine waste materials such as clay-containing compounds, for example, mine tailings, that provide economical alternatives to landfill disposal of these wastes.

There currently exists a number of known commercial uses for waste siliceous particulate materials such as coal combustion fly ash and bottom ash as substitute materials in the production of low strength cementicious products. The fly ash can be a substitute for Portland cement in the production of concrete. Or, the fly ash or bottom ash, and at least one other component selected from the group consisting of paper mill waste, lime, clay, Portland cement, or plaster of paris, can be mixed with a strong oxidant to produce a shaped body that is allowed to harden and strengthen over time at ambient conditions.

Other methods include producing a stabilized cementiciously-bonded building block by combining fly ash and bottom ash with gypsum, lime, and calcium carbonate. The resulting admixture is formed into a block under a compressive force, and the block is allowed to cure under ambient conditions without the application of external heat.

Another known method of utilizing both fly ash and bottom ash to produce shaped cementiciously-bonded structural products, involves adding water to a mixture of fly ash and bottom ash, and compressing the moistened mixture at a pressure in the range of 1,000 to 2,500 psi to form a molded body which is said to subsequently cure and strengthen at ambient conditions.

These prior art disclosures typically produce shaped construction products that exhibit relatively low compressive strengths that increase slowly with time to ultimate levels that are inadequate for the use of these products as high-strength building brick or block.

High strength, crystalline-bonded shaped building products produced from naturally-occurring materials, and methods for their manufacture, are known in the art. Calcium silicate bricks, produced essentially from sand and lime and intended for use in brick masonry applications, are disclosed in the American Society For Testing Materials specification ASTM C73-94a. Shaped building bricks and blocks of this type are produced on a commercial basis by Schneider Kalksandsteine GmbH in Germany and a number of other companies in Europe. Such bricks and blocks are known to be widely used in residential and commercial building construction in Germany, the Netherlands, and Russia.

Calcium silicate bricks are normally produced by mixing 85%-96% sand, 3%-8% lime, and up to 10% water, compacting the mixture to form a shaped body, and curing said body at an elevated temperature in pressurized steam for a time sufficient to allow the formation and growth of calcium silicate crystals.

It is also known in the art to add ground waste glass to a mixture comprised of a clay-containing material resulting from the burning of brown coal, quartz sand, lime, and water, support a pozzoulanic reaction that enhances the stability of the pressed brick shape produced therefrom during the drying prior to conventional firing of the dried brick.

There remains, therefore, a need for a practical method for the manufacture of high strength, bonded building bricks and blocks composed primarily of clay-containing compounds including mining wastes, such as non-ferrous mine tailings, and quarry fines. Further, there is a need for a method for the manufacture of high strength building bricks and blocks composed of material that does not contain free silica. A process capable of producing such bricks and blocks would substantially reduce the need for landfill disposal of these wastes.

SUMMARY OF INVENTION

The present invention has met the hereinabove described needs. The invention provides a method of making a shaped product. The method includes establishing a blend by admixing a major portion by weight of a clay-containing compound with a calciferous additive wherein a first portion of said clay-containing compound has an average particle size that is coarser than a second portion of said clay-containing compound; blending water with the blend to create a moistened blend; forming the moistened blend into a shaped product by compacting the moistened blend at a pressure of about 34,474 to 68,948 kPa (i.e., about 5000 to 10,000 psi); and hydrothermally treating the shaped product to facilitate the formation of an interlocking mineralogical matrix therein.

In a preferred practice of the method of the invention, the calciferous additive can be free lime. Curing is preferably effected at elevated temperature and pressure for a predetermined period of time to produce the desired mineralogical crystalline phase.

It is an object of the present invention to provide a high strength, structurally stable shaped building product including fine particulate clays, such as non-ferrous mine tailings or quarry fines, and an economical, efficient method for its manufacture.

It is another object of the invention to provide such a high strength, structurally stable shaped building product in which the high strength and structural stability are imparted by a matrix that intimately bonds the clay-containing compound within the product structure.

It is a further object of the invention to provide such a high strength, structurally stable shaped building product in which the bonding matrix is achieved by making said product under controlled conditions of elevated temperature, pressure, and humidity.

It is a further object of the invention to provide a method of making a high strength, structurally stable shaped building product including a clay-containing compound, such as non-ferrous mine tailings, which product is strengthened by an interlocking crystalline matrix in which said matrix consists primarily of hydrothermally-grown Tobermorite crystals.

It is a further object of the invention to provide a high strength shaped man-made building product in which the major ingredients are man made and the adverse effects of impurities on mechanical properties are significantly reduced.

It is a further object of the invention to provide a method of making a precisely shaped building product from a clay-containing compound by applying pressure to said mixture in a mold of the desired shape.

It is a further object of this invention to provide a method of making a load bearing building product of improved quality and consistency.

It is a further object of this invention to provide a method of making a precisely shaped building product having a permanently colored exterior surface.

These and other objects of the invention will be more fully understood from the following detailed description of the invention.

DESCRIPTION OF PREFERRED EMBODIMENTS

As employed herein, the terms "building blocks" or "building bricks" are employed interchangeably and shall mean structural building blocks or bricks of predetermined shape or size, a plurality of which are adapted to be employed in an assembled array in walls, in roads or walkways, and related building product and non-building product uses, or aggregate pieces, regardless of whether the blocks or bricks are load bearing or not and regardless of whether they have rectangular faces or not.

As employed herein, the term "dry mixture" refers to a mixture containing non-ferrous mine tailings and a calciferous additive.

As employed herein, the terms "wet mixture", "moistened mixture", and "moistened blend" are used interchangeably and refer to a mixture containing non-ferrous mine tailings and a calciferous additive mixed with a liquid, such as water.

The present invention is applicable to the production of a broad spectrum of shaped building blocks or bricks from a mixture comprised of a clay-containing compound and an additive that react to form a bonding matrix that tightly binds said individual clay particles into a strong, coherent, stable structure.

The invention provides a method of (a) establishing a blend by combining a first portion of a clay-containing compound, and a second portion of a clay-containing compound, wherein the first portion is composed of particulate material that has an average particle size that is more coarse than the average particle size of the particulate material of the second portion, with a calciferous additive, (b) blending the clay-containing portions with water, (c) compacting the moistened blend into the desired shape at a pressure sufficient to attain intimate contact among the clay, and (d) curing said compacted shape under conditions of elevated temperature and pressure in a moisture laden atmosphere for sufficient time to permit formation of a bonding matrix (e.g., an interlocking crystalline matrix) that imparts structural strength and stability to said cured shape.

The preferred method steps of the present invention include, but are not limited to, specifying (a) proportions of fine and coarser particle size distributions, (b) the type and amount of calciferous additive employed, (c) the quantity of water added to the tailings/additive mixture, (d) the pressure used to form the desired shape, and (e) the temperature, pressure, humidity, and time employed during curing of the formed shape.

High strength shaped building products can be produced in accordance with the present invention from clay-containing compounds such as suitable clay-containing compounds include a wide variety of such materials known in the art. Non-limiting examples include but are not limited to, non-ferrous mine tailings, quarry fines and mixtures thereof. In the present invention, the clay-containing compound includes a mixture of fine particulate material and coarser particulate material. The clay compound can include a blend or mix of compounds wherein a first portion includes coarser particles and wherein a second portion includes fine particles. The average particle size of the fine particles is about 100 microns or less. In a preferred embodiment, the average particle size of the fine particles can be from about 25 microns to about 75 microns. The average particle size of the coarser particles can vary widely and can depend upon the resultant product being manufactured. The larger the size of the resultant product, the larger the coarser particles that can be employed. It is typical for the coarser particles to have an average particle size of greater than about 75 microns.

It has been determined that the average particle size of the final mixture of fine clay particles and coarser clay particles utilized to produce shaped building products can have a significant effect upon the physical and mechanical properties of the product and that the preferred average particle size of a given mixture used to produce a given product can depend upon the size and shape of the product. The average particle size of the final mixture is controlled by the particle size distribution of the fine and coarser clay particles as discussed above and the proportion of each.

The proportions of fine and coarser clay particles in the clay compound can vary widely and can depend on the structural specifications of the final product being manufactured. In one embodiment, the proportion of fine particles can be about 100% by weight or less of the clay compound. In another embodiment, the proportion of fine particles present in the clay compound can be about 25% by weight or greater. For example, wherein pavers or bricks are the final product being manufactured, the proportion of fine particles to coarser particles can be about 50% to 50% by weight.

The particle size distribution and average particle size determined as heretofore described for the clay-containing compound employed can vary significantly and can be controlled by processing the clay particles, such as by comminuting and/or sizing, to achieve the desired average particle size in the resultant mixture of fine and coarser clay particles.

Shaped building products having mechanical properties equivalent to those of conventional building brick and block can be produced from mixtures of fine and coarser clay particles in which the ratio of fine to coarser varies over a wide range.

The average particle size of a fine/coarser clay mixture having a fixed fine:coarser ratio can be varied by altering the average particle size of either the fine, the coarser, or both. In an embodiment, it can be achieved by controlling the average particle size of the coarser clay particles.

The amount of the clay-containing compound (e.g., the total of the fine and coarser clay particle material) is a major portion of the mixture/blend of the present invention. The term "major portion" can include up to about 90% by weight of the mixture/blend.

Suitable clay-containing materials for use in the present invention can include but are not limited to non-ferrous mine tailings, such as copper mine tailings, and quarry fines. Non-limiting examples of suitable clay-containing compounds can include clay minerals such as plagioclase, muscovite, kaolinite, biotite, hornblende, chlorite, montmorillonite, illite, vermiculite, serpentine, pyrophyllite, talc, phlogopite, glauconite, prehnite, stilpnomelane, apophyllite, anthophyllite, cummingtonite, tremolite-actinolite, pigeonite, diopside, hedenbergite, augite, acmite, jadeite, spodumene, wollastonite, pectolite, rhodonite, axinite, beryl, cordierite, lawsonite, pumpellyite, gehlenite, akermanite, hemimorphite, vesuvianite, zoisite, clinizoisite, epidote, allanite, olivine, willemite, zircon, thorite, titanite, andalusite, sillimanite, kyanite, staurolite, topaz, datolite, xhloritoid, and mixtures thereof.

The clay-containing compounds suitable for use in the present invention do not include the presence of free silica. As used herein and the claims, "free silica" means reactive $SiO_2$. Typically, free silica has an average particle size of less than about 75 microns. In some instances, free silica can have an average particle size of less than about 10 microns, or less than about 5 microns. Suitable clay-containing compounds for use in the present invention contain silicate. Not intending to be bound by any particular theory, it is believed the silicate present in the clay-containing compound participates in the formation of tobermorite in the final product (e.g., block, brick, paver and the like).

It has been further determined that the amount of calciferous additive employed to optimize mechanical and physical properties of the shaped building products of this invention is controlled by the total surface area of the reactive particles in the mixture and that the amount of additive required increases as the total particle surface area in the mix increases. The preferred quantity of calciferous material added to a clay-containing mixture is that which maximizes the clay/additive reaction and minimizes the amount of unreacted calciferous material, e.g., "free lime", in the resultant product. As used herein and the claims, "free lime" means CaO which is reactive.

It has also been found that the optimum combination of strength and structural integrity may be achieved in shaped building blocks manufactured in accordance with this invention when the amount of the calciferous additive, which may be in the form of hydrated lime [$CaO.H_2O$] or quicklime [CaO], in the clay/additive mixture is maintained in the range of 5% to 20% by weight, and preferably in the range of 10% to 15% by weight of the mixture when added as hydrated lime. When the additive is in the form of quicklime or other calciferous material, the percentage of quicklime or other calciferous material added is adjusted to yield a final calcium content in the mix that is equivalent to the amount of calcium that would have been added to the mix from the use of hydrated lime at the desired percent addition.

It has also been determined that superior properties are achieved when the free water added to the mixture prior to shaping is maintained in the range of 5% to 15% by weight of the mixture including the water. When quicklime is substituted for hydrated lime, the amount of free water added to the mix is preferably increased by an amount equal to the amount of water required to hydrate the quicklime.

To maximize particle-to-particle contact within the shaped building block of the invention, crystal growth during hydrothermal treatment, and the compressive strength of the resultant product, it is preferred that the moistened mixture be shaped shortly after blending by compacting the mixture at a pressure in the range of 34,474 kPa to 68,948 kPa (i.e., 5,000 psi to 10,000 psi) in a mold cavity having the desired shape. A compacting pressure of about 48,263 to 55,158 kPa (i.e., 7,000 to 8,000 psi) is preferred. Dwell time at pressure normally ranges from about 1 second to 3 minutes. Shaped building products compacted in this manner normally have an as-compacted density in the range of about 1.5 grams/cubic centimeter to 2.5 grams/cubic centimeter.

Hydrothermal curing of the compacted shape is preferably achieved by curing the as-compacted shape in a saturated steam atmosphere at a temperature ranging from 180° C. to 225° C. at a pressure between 1067 kPa and 2515 kPa (i.e., 140 psig and 350 psig) for a period of 4 to 8 hours in an autoclave or similar apparatus. In order to maximize Tobermorite crystallite formation and create an optimum interlocking Tobermorite crystallite matrix within the structure during curing, it is preferred that the shape be cured at about 190° C. to 210° C. for about 5 to 7 hours at a pressure of about 1618 to 1894 kPa (i.e., about 220 to 260 psig).

Shaped building blocks produced in accordance with the method of the invention can have a cured density in the range of about 95 pounds/cubic foot to 160 pounds/cubic foot, a compressive strength ranging from about 13,790 kPa to 58,605 kPa (i.e.,about 2,000 psi to 8,500 psi) or from about 24,132 kPa to 58,605 kPa (i.e.,about 3,500 psi to 8,500 psi), and water absorptivity of about 15% to 20%. Table 1 compares certain properties and characteristics of shaped building blocks of the present invention with those of conventional prior art clay building brick and concrete building block. The properties of the shaped building block produced in accordance with the method of the invention have mechanical properties which compare favorably with those of the prior art which are used as building bricks and blocks.

TABLE A

| PROPERTY | PRODUCT OF INVENTION | RED CLAY BUILDING BRICK | CONCRETE BUILDING BLOCK |
| --- | --- | --- | --- |
| DENSITY (LB/CU FT) | 95-160 | 90-150 | 110-140 |
| COMPRESSIVE STRENGTH (PSI) | 2,000-8,500 | 1,500-12,000 | 1,000-5,000 |

The invention is also adapted to provide colored building bricks, if desired. The natural color of the bricks varies depending on the source of the clay-containing compound employed to manufacture the bricks. Shaped building bricks having colors of a permanent nature that differ from the color normal to products produced from a mixture of clay-containing compounds can be produced in accordance with this invention by incorporating into the mixture either prior to blending with water, as is preferred, or prior to compacting, between 2% and 7% by weight of a naturally colored mineralogical component into the clay-containing mix.

The mineralogical colorants added can be naturally-occurring minerals or synthetically produced materials such as those used to color fired ceramics and similar products. In order to assure that the structural and aesthetic characteristics of the shaped building products are preserved, the color additives needs to be stable when exposed to conditions of the manufacturing process and field service.

The coloration of the products of the current invention can be made uniform throughout the product by blending the mineralogical colorant uniformly throughout the constituent mixture prior to compacting. Alternatively, the coloration can be restricted to a surface of the product by layering the colored mix and the non-colored mix in the compacting mold. Obviously, a multi-colored or multi-layered or patterned product can be produced by carefully placing controlled volumes of different-colored mixes in desired locations within the compacting mold prior to applying the compacting pressure.

The number of basic colors, shades of each color, and color patterns that can be achieved in the heretofore described manner are numerous.

For example, red bricks have been produced by adding about 2-3% by weight of hematite to a clay-containing mixture. Black bricks can be produced by adding thermally stable magnetite to the blend. Bricks exhibiting other permanent colors can be produced by adding a mineralogical compound of the desired color to the desired mine tailings mixture.

Various shades of blue bricks can be produced by blending one, or more, mineralogical blue colorants of differing shade into the brick mix. Blue colorants suited to producing colored bricks in accordance with the current invention include, but are not limited to, mineralogical compounds containing cobalt and aluminum, with or without nickel, chromium, and zinc; compounds containing zirconium, vanadium, and silicon; and other mineralogical compounds imparting equivalent permanent blue coloration.

Various shades of yellow bricks can be produced by blending one, or more, mineralogical yellow colorants of differing shade into the brick mix. Yellow colorants suited to producing colored bricks in accordance with the current invention include, but are not limited to, mineralogical compounds containing zirconium and one or more elements from the group consisting of praseodymium, silicon, and vanadium; compounds containing vanadium and tin; compounds containing aluminum and manganese; compounds containing cadmium and zinc; and other mineralogical compounds imparting equivalent permanent yellow coloration.

Various shades of green bricks can be produced by blending one, or more, mineralogical green colorants of differing shade into the brick mix. Green colorants suited to producing colored bricks in accordance with the current invention include, but are not limited to, mineralogical compounds containing cobalt and one or more elements from the group consisting of nickel, zinc, titanium, chromium and aluminum; and other mineralogical compounds imparting equivalent permanent green coloration.

In addition to the aforementioned use of hematite, various shades of red and orange bricks can be produced by blending one, or more, mineralogical red or orange colorants of differing shade into the brick mix. Red and orange colorants suited to producing colored bricks in accordance with the current invention include, but are not limited to, mineralogical compounds containing calcium and tin, chromium, and silicon; compounds containing zirconium, iron, and silicon; compounds containing aluminum and manganese; compounds containing cadmium, sulfur and selenium; and other mineralogical compounds imparting equivalent permanent red or orange coloration.

Various shades of purple bricks can be produced by blending one, or more, mineralogical purple colorants of differing shade into the brick mix. Purple colorants suited to producing colored bricks in accordance with the current invention include, but are not limited to, mineralogical compounds containing cobalt and silicon; compounds containing tin and chromium; and other mineralogical compounds that impart equivalent permanent purple coloration.

Various shades of brown bricks can be produced by blending one, or more, mineralogical brown colorants of differing shade into the brick mix. Brown colorants suited to producing colored bricks in accordance with the current invention include, but are not limited to, mineralogical compounds containing zinc and one or more elements from the group consisting of chromium, aluminum, zinc, and iron; compounds containing iron and chromium or manganese; and other mineralogical compounds that impart equivalent permanent brown coloration.

Various shades of black bricks can be produced by blending one, or more, mineralogical black colorants of differing shade into the brick mix. Black colorants suited to producing colored bricks in accordance with the current invention include, but are not limited to, mineralogical compounds containing copper and one or more elements from the group consisting of cobalt, nickel, chromium, iron, and manganese; compounds containing iron and cobalt or chromium; compounds containing titanium, vanadium, and antimony; and other mineralogical compounds that impart equivalent permanent black coloration.

Various shades of gray bricks can be produced by blending one, or more, mineralogical gray colorants of differing shade into the brick mix. Gray colorants suited to producing colored bricks in accordance with the current invention include, but are not limited to, mineralogical compounds containing tin and antimony; compounds containing zirconium and one or more elements from the group consisting of cobalt, nickel, and silicon; and other mineralogical compounds that impart equivalent permanent gray coloration.

A wide range of other colorations can be achieved by blending two or more of the aforementioned color groups. For example, red and blue colorants can be blended prior to incorporation into the brick constituent mix to produce purple bricks, red and yellow colorants can be blended to produce orange bricks, etc. The shade and intensity of the color are dependent upon the amount of colored mineral or minerals employed.

As a result of the aforementioned options, it is possible to produce decorative shaped building products in a wide variety of colors, shades, and patterns.

For convenience of disclosure, the disclosure herein has made reference to specific compositions, particle size distributions, processing parameters, colors, and product configurations. It will be obvious to those skilled in the art that one may practice the invention employing other compositions, particle size distributions, processing parameters, colors, and product configurations.

While, for convenience of disclosure, the above discussion and illustrations have made reference to the use of lime, it will be obvious to those skilled in the art that various sources of free lime can also be used.

While the discussion herein has made reference to shaped building products such as building brick and block, it will be apparent to those skilled in the art that one may practice the invention to produce shaped construction aggregate and shapes for non-construction purposes.

It will be appreciated that the method of this invention provides a cost effective means for producing commercially viable strong, stable shaped building bricks or blocks from mining wastes such as non-ferrous mine tailings. The increased commercial use of such wastes resulting from this invention can reduce the volume of mining wastes that must be disposed of in landfills. The utilization of this invention to achieve this end is, therefore, of environmental benefit to society.

The following examples provide specific preferred practices in employing the method of the invention.

EXAMPLES

The examples provided herein verify that shaped building bricks or blocks manufactured in accordance with the method of the present invention exhibit properties and characteristics that make said products suitable for use in residential and commercial building construction and, as shown by the data in Table 1, are viable alternatives to conventional prior art clay building bricks and concrete block.

Example 1

The following samples of mine tailings were used in this example. Seven samples were identified as Tailings I through VII. The tailing samples were blended together for testing.

Mineralogy

Table I contains the mineralogy for each of the samples.

TABLE I

Quantitative Mineralogy of Sand and Fines

|  | Tailing I | Tailing II | Tailing III | Tailing IV | Tailing V | Tailing VI | Tailing VII |
|---|---|---|---|---|---|---|---|
| quartz | 24.4 | 22.0 | 23.7 | 22.5 | 24.0 | 21.2 | 26.2 |
| orthoclase | 17.9 | 16.2 | 18.0 | 21.6 | 19.8 | 20.0 | 20.8 |
| plagioclase | 25.3 | 23.0 | 26.0 | 31.0 | 30.1 | 28.7 | 32.5 |
| chlorite | 1.3 | 1.7 | 1.6 | 0.5 | 0.4 | 0.5 | 1.3 |
| kaolinite | 1.3 | 1.9 | 1.6 | 1.1 | 1.2 | 1.3 | 1.2 |
| calcite | 1.8 | 1.7 | 1.7 | 1.3 | 1.5 | 1.2 | 1.8 |
| epidote | 1.9 | 1.3 | 1.4 | 1.0 | 0.7 | 1.0 | 0.9 |
| magnetite | 1.0 | 0.8 | 0.8 | 0.6 | 0.7 | 0.5 | 0.0 |
| muscovite | 7.4 | 7.2 | 7.1 | 4.7 | 5.0 | 4.4 | 5.3 |
| gypsum | 1.8 | 2.0 | 2.2 | 0.5 | 0.3 | 0.3 | 1.4 |
| pyrite | 0.7 | 0.5 | 0.4 | 0.1 | 0.1 | 0.1 | 0.3 |
| hornblende | 2.5 | 2.7 | 1.6 | 0.0 | 0.0 | 0.0 | 0.0 |
| andradite | 0.0 | 0.0 | 0.0 | 0.0 | 0.0 | 0.0 | 0.0 |
| siderite | 0.0 | 0.0 | 0.0 | 0.0 | 0.0 | 0.0 | 0.0 |
| biotite | 5.8 | 6.2 | 5.4 | 4.0 | 4.3 | 2.9 | 4.3 |
| amorphous glass | 6.9 | 12.8 | 8.3 | 11.1 | 11.9 | 17.7 | 4.1 |
| carbon | 0.19 | 1.8 | 0.19 | 0.18 | 0.17 | 0.17 | na |
| sulfur | 1.12 | 1.16 | 1.20 | 0.29 | 0.26 | 0.27 | na |
| clay composition (wt %) | 43.04 | 41.08 | 42.79 | 41.11 | 40.99 | 37.9 | 44.56 |

Samples I, II, III and VII contained a higher concentration of clay minerals (chlorite, kaolinite, and muscovite). These samples also contained a higher amount of sulfur than Samples IV, V and VI, which is consistent with the higher gypsum content in Samples I, II, III and VII.

Lime Mineralogy

Since the lime was the primary reagent, it was identified how much of the active component was present in the material being used.

The lime used was a high calcium lime with minimal magnesium content. The mineralogy for two different sources of lime is shown in Table II.

TABLE II

Quantitative Mineralogy for the Lime Additive

|  |  | Hydrated Lime | Hydrated Lime |
|---|---|---|---|
| portlandite | Ca(OH)2 | 95.0 | 92.9 |
| calcite | CaCO3 | 1.3 | 5.0 |
| aragonite | CaCO3 | 1.7 | 0.0 |
| dolomite | CaMg(CO3)2 | 0.0 | 0.1 |

TABLE II-continued

Quantitative Mineralogy for the Lime Additive

|  |  | Hydrated Lime | Hydrated Lime |
|---|---|---|---|
| magnestite | MgCO3 | 1.2 | 1.5 |
| siderite | FeCO3 | 0.8 | 0.5 |
| brucite | Mg(OH)2 | 0.0 | 0.0 |
| quartz | SiO2 | 0.0 | 0.0 |

Hydrated lime was used because it provided good control of the water requirement in the mixes. In commercial practice, quicklime typically would be used and slaked during the mixing process. This practice would provide cost savings for this reagent.

Test Mixes

A variety of mixes were evaluated using various proportions of Samples I-VII as shown below.

Four different mixtures were prepared for evaluation. The effect of particle size distribution, and the presence of additional lime (15% instead of the 13%). The results of this testing are presented in Table III.

TABLE III

Comparison of Various Mixes (3" x 3" samples)

| | Mixes Tested | | | |
|---|---|---|---|---|
| Mesh Size | A | B | C | D |
| +100 | 32.2 | 35.5 | 35.5 | 12.80 |
| −100 + 200 | 16.9 | 7.4 | 7.4 | 17.44 |
| −200 + 500 | 26.7 | 32.0 | 32.0 | 34.86 |
| −500 | 24.1 | 25.1 | 25.1 | 34.90 |

| | Compressive Strength | | | | | | | |
|---|---|---|---|---|---|---|---|---|
| | A | | B | | C | | D | |
| | psi | kPa | psi | kPa | psi | kPa | psi | kPa |
| Average Compression Strength | 5818 | 40086 | 6281 | 43276 | 6613 | 45564 | 4063 | 27994 |
| | 6562 | 45212 | 6354 | 43779 | 6438 | 44358 | 4188 | 28855 |

TABLE III-continued

Comparison of Various Mixes (3" × 3" samples)

| | | | | | | | |
|---|---|---|---|---|---|---|---|
| 6250 | 43062 | 6000 | 41340 | 5875 | 40479 | | |
| 6000 | 41340 | 6156 | 42415 | 6031 | 40554 | | |
| 6158 | 42,400 | 6198 | 42,780 | 6239 | 42,700 | 4126 | 28,400 |

Mixes
A 50% Tailings VII/50% Tailings IV, V, VI
B 100% Tailings I-III
C 100% Tailings I-III with Additional Lime
D 100% Tailings VII The average particle size of the tailings in Samples I, II and III was different from the average particle size of the tailings in Sample VII. Samples I, II and III contained coarser fines than Sample VII. Table III demonstrates a balanced size distribution (e.g., including both fine and coarser materials), such as mixes A and B, produced improved compressive strength results as compared to mix D that included material having only a fine size distribution. Further, it was shown that the additional lime in mix C did not provide additional strength. Based on this information, a production run mix was set at equal amounts of a mixture of Samples IV, V and VI and Sample VII, with a lime addition of 13% by weight of the dry ingredients.

The quantitative mineralogy for the final batch mix is presented in Table IV.

TABLE IV

Weighted Mineralogy

| | Green Mix | Brixx Production Run | |
|---|---|---|---|
| quartz | 26.58 | 20.11 | Mineral was eliminated or reduced from mix |
| plagioclase | 30.70 | 26.07 | |
| muscovite | 6.74 | 4.30 | |
| kaolinite | 1.50 | 0.79 | |
| biotite | 5.40 | 3.91 | |
| gypsum | 1.83 | 0.00 | |
| hornblende | 1.22 | 0.00 | Mineral was created in Brixx process. |
| calcite | 1.89 | 6.79 | |
| epidote | 1.29 | 3.27 | |
| tobermorite | 0.00 | 10.28 | Magnetite was oxidized to hematite |
| magnetite | 0.46 | 0.00 | |
| hematite | 0.00 | 1.07 | |
| orthoclase | 20.45 | 22.00 | |
| pyrite | 0.46 | 0.47 | |
| chlorite | 1.52 | 0.93 | |

The final batch mix used for the production run consisted of:
  50 lb (22.8 kg) of Tailings IV, V, VI
  50 lb (22.8 kg) of Tailings VII
  13 lb (5.9 kg) of hydrated lime
  13 lb (5.9 kg) of aggregate
  5 lb (2.25 kg) of red pigment The aggregate consisted of broken reject cured bricks. The average particle size of the aggregate was 7 mm. The aggregate tends to enhance mechanical properties of the cured product by reducing stress crack propagation.

The dry components were mixed in a high intensity mixer for 30 seconds. Approximately 8,000 ml of liquid was added to the mix and the wet mix was stirred for an additional 20 seconds. The liquid consisted primarily of water with the addition of an organic additive found to enhance material flow during pressing of the building blocks. The additive was commercially available under the trade name "Slik Pak". Slik Pak was added to the water in a 1 ml Slick Pak to 60 ml of water ratio.

Effect of Pressing Force

Four full size building blocks were pressed at 5000 psi (34,450 kPa), 7500 psi (51,700 kPa), and 10,000 psi (68,900 kPa) psi. The cured compressive strengths for these samples are presented in Table V.

TABLE V

Effect of Pressing Force on Cured Compressive Strength

| 100% Tailings (I, II and III) | | | | | | Mix A | |
|---|---|---|---|---|---|---|---|
| presd @ 5000 lb. | | presd @ 7500 lb. | | presd @ 10000 lb. | | presd @ 5000 lb. | |
| psi | kPa | psi | kPa | psi | kPa | psi | kPa |
| 5376 | 37041 | 5911 | 40727 | 6565 | 45233 | 5818 | 40086 |
| 5376 | 37041 | 5136 | 35387 | 6526 | 44964 | 6562 | 45212 |
| 6159 | 42436 | 6143 | 42326 | 6704 | 46191 | 6000 | 41340 |
| 5200 | 35828 | 5613 | 38674 | 6612 | 45557 | 6000 | 41340 |

The compressive strength was determined in accordance with ASTM Test Method C67. The strengths for the building blocks produced at 5000 psi (34,450 kPa) and 7500 psi (51,700 kPa) pressing force were essentially the same; the samples produced at 10,000 psi (68,900 kPa) yielded about 10% greater strengths. It is believed that this is due to more intimate particle packing resulting from the additional pressing force. However, the samples produced with the 5000 psi (34,450 kPa) pressing force also demonstrated sufficient strength to exceed the strength specification for Grade SW (severe weather) usage. The ability to use a lower pressing force is a very significant economic factor; because for a given press capacity, the number of shapes produced per stroke can be doubled when using the lower pressing force.

Production Run

Approximately 1000 building blocks were produced during a production run. The same mix, i.e., the 50/50 mix A shown in Table V, was used for all of the runs with the exception that for half of the production a red pigment was added to the mix to provide a product resembling conventional fired clay bricks, four batches were produced with pigments that each yielded pink, brown, blue and green products. The process consisted of the following steps:
  Preparation of the mix;
  Pressing the mix into shaped blocks;
  Loading the blocks onto a skid and placing the skid in an autoclave; and
  Curing the blocks at a temperature of 200° C. in saturated steam (225 psi) for 6 hours.

The mineralogy for the production run blocks demonstrated the formation of fairly significant amounts of tobermorite (>10%). This is the bonding mineral formed during the curing operation and this level of tobermorite is consistent with the improved mechanical properties reported below.

Mechanical Properties

Table V provides the compressive strength values for the blocks generated during the production run.

TABLE V

Compression Strength (psi) for Blocks Pressed at 5,000 psi

|  | psi | kPa |
|---|---|---|
|  | 5818 | 40,100 |
|  | 6562 | 45,212 |
|  | 6000 | 41340 |
|  | 6000 | 41340 |
| Average Compression Strength | 6095 | 42,000 |

Water Absorption

The water absorption in accordance with ASTM C73-99 was determined for a sampling of the production run and these values are provided in Table VI.

TABLE VI

Water Absorption

| lb/cu.ft | kg/m3 |
|---|---|
| 13.4 | 215 |
| 14.98 | 240 |
| 14.06 | 225 |
| Average = 14.15 | 226 |

(Max. Value Per ASTM C73.99=15 lb/cu·ft. 240 kg/m3)

Since the absorption value was less than the maximum value for severe weather service, these blocks met both the compressive strength and absorption criteria for severe weather applications.

Toxicity Characteristic Leaching Procedure

Samples from the production run were crushed and submitted to a commercial environmental testing laboratory. The results of this testing are provided in Table VII.

TABLE VII

TCLP Results for Production Blocks

| TCLP Metals | Result | Units |
|---|---|---|
| Arsenic | <0.10 | mg/L |
| Barium | <1.0 | mg/L |
| Cadmium | <0.005 | mg/L |
| Chromium | <0.05 | mg/L |
| Lead | <0.1 | mg/L |
| Mercury | <0.002 | mg/L |
| Selenium | <0.10 | mg/L |
| Silver | <0.05 | mg/L |

None of the eight RCRA metals exceeded the detection limit of the instruments used.

Whereas particular embodiments of the invention have been described herein for purposes of illustration, it will be evident to those skilled in the art that numerous variations of the details may be made without departing from the invention as defined in the appended claims.

We claim:

1. A method of making a shaped product comprising:
    combining a major portion by weight of a clay-containing compound which essentially does not include free silica, said clay-containing compound comprising clay mineral selected from the group consisting of plagioclase, muscovite, kaolinite, biotite, hornblende, chlorite, montmorillonite, illite, vermiculite, serpentine, pyrophyllite, talc, phlogopite, glauconite, prehnite, stilpnomelane, apophyllite, anthophyllite, cummingtonite, tremolite- actinolite, pigeonite, diopside, hedenbergite, augite, acmite, jadeite, spodumene, wollastonite, pectolite, rhodonite, axinite, beryl, cordierite, lawsonite, pumpellyite, gehlenite, akermanite, hemimorphite, vesuvianite, zoisite, clinizoisite, epidote, allanite, olivine, willemite, zircon, thorite, titanite, andalusite, sillimanite, kyanite, staurolite, topaz, datolite, xhloritoid, and mixtures thereof, with a calciferous additive to form a first mixture in a dry form, wherein a first portion of said clay-containing compound has an average particle size that is coarser than a second portion of said clay-containing compound;
    mixing the first mixture in the dry form;
        combining water with said first mixture to create a second mixture in a moistened form, wherein said water is present in an amount from about 5 to 15 percent of said second mixture on a weight basis;
    mixing the second mixture in the moistened form;
    compacting said second mixture with pressure from about 34,474 to 68,948 kPa (5000 to 10,000 psi) to form a shaped product; and
    hydrothermally treating said shaped product to facilitate the formation of an interlocking mineralogical matrix therein.

2. The method of claim 1 including employing as said calciferous additive lime selected from the group consisting of hydrated lime, quicklime and mixtures thereof.

3. The method of claim 2 including employing said calciferous additive in an amount of about 5 to 20 percent of the dry mixture on a weight basis.

4. The method of claim 2 including employing lime as said calciferous additive in an amount of about 10 to 15 percent of the dry mixture on a weight basis.

5. The method of claim 1 including effecting said hydrothermal treatment at a temperature of about 180 to 225 degrees Celsius for about 4 to 8 hours.

6. The method of claim 5 including effecting said hydrothermal treatment at a pressure of about 1067 to 2515 kPa (140 to 350 psi).

7. The method of claim 1 including effecting said compacting in a mold having a cavity of the desired shape for about 1 second to 3 minutes.

8. The method of claim 1 including employing said method to make a building block.

9. The method of claim 8 including creating said building block having a compressive strength of about 13,790 to 58,605 kPa (2,000 to 8,500psi).

10. The method of claim 9 including creating said building block having a compressive strength of about 24,132 to 58,605 kPa (3,500 to 8,500psi).

11. The method of claim 1 including adding a mineralogical coloring agent to produce a shaped product having a desired color.

12. The method of claim 11 including effecting said coloring agent addition prior to combining said water with said dry mixture.

13. The method of claim 1 wherein said clay-containing compound is selected from the group consisting of non-ferrous mine tailings, quarry fines and mixtures thereof.

14. The method of claim 13 wherein said non-ferrous mine tailings comprise copper.

15. The method of claim 1 wherein said first portion has an average particle size of greater than about 75 microns.

16. The method of claim 1 wherein said second portion has an average particle size of about 100 microns or less.

17. The method of claim 1 wherein said first portion and said second portion each comprise 50% by weight of the clay-containing compound.

18. The method of claim 1 wherein said clay-containing compound comprises 90 percent by weight of the dry mixture.

* * * * *